US012115811B1

(12) United States Patent
Alnaim

(10) Patent No.: US 12,115,811 B1
(45) Date of Patent: Oct. 15, 2024

(54) STRAIGHTEDGE WITH HOLDER FOR WRITING IMPLEMENT

(71) Applicant: KING FAISAL UNIVERSITY, Al-Ahsa (SA)

(72) Inventor: Fahad Ahmed M Alnaim, Al-Ahsa (SA)

(73) Assignee: King Faisal University, Al-Ahsa (SA)

( * ) Notice: Subject to any disclaimer, the term of this patent is extended or adjusted under 35 U.S.C. 154(b) by 0 days.

(21) Appl. No.: 18/376,048

(22) Filed: Oct. 3, 2023

(51) Int. Cl.
*B43L 7/08* (2006.01)

(52) U.S. Cl.
CPC ........ *B43L 7/08* (2013.01)

(58) Field of Classification Search
CPC ........ B43L 7/08
See application file for complete search history.

(56) References Cited

U.S. PATENT DOCUMENTS 1,396,806 A * 11/1921 Beals ........ B43L 7/08 33/485
2,579,121 A * 12/1951 Nauheim ........ B43L 9/04 33/458
3,015,889 A * 1/1962 Godman ........ B25H 7/04 33/666
3,386,191 A * 6/1968 Michel ........ G09B 21/002 434/117
4,660,295 A * 4/1987 Emrich ........ G01B 3/04 33/486
5,309,642 A * 5/1994 McGinnis ........ B26B 29/06 33/476
5,471,753 A * 12/1995 Rodrigues ........ B26B 29/06 33/485
7,080,459 B1 * 7/2006 Khan ........ B43L 13/002 33/30.5
7,178,246 B2 * 2/2007 McCallum ........ B26B 5/005 30/294
7,383,635 B1 * 6/2008 Stoneberg ........ B43L 7/007 33/27.03
7,481,001 B1 * 1/2009 Rao ........ B25H 7/00 33/42
8,499,467 B2 * 8/2013 Elardo ........ B26B 29/06 33/485
2002/0032969 A1 * 3/2002 Cardew ........ B43L 13/043 33/44
2003/0051363 A1 * 3/2003 Hofmeister ........ A47G 1/205 33/613
2005/0034244 A1 * 2/2005 McCreesh ........ B43L 7/005 7/164

(Continued)

*Primary Examiner* — Yaritza Guadalupe-McCall
(74) *Attorney, Agent, or Firm* — Nath, Goldberg & Meyer; Joshua B. Goldberg

(57) ABSTRACT

A straightedge with a holder for a writing implement includes a planar measuring surface, such as a ruler, set square or the like, with a slide track. The slide track extends along an edge of the planar measuring surface. A first end of a writing implement holder is slidably mounted within the slide track, and a second end of the writing implement holder is adapted for releasably holding a writing implement, such as a pen, pencil or the like. The writing implement holder is movable along the slide track such that the writing implement moves along the edge of the planar measuring surface. A support made from cork, rubber or the like may be located on a rear surface of the planar measuring surface.

9 Claims, 3 Drawing Sheets

(56) References Cited

U.S. PATENT DOCUMENTS

| | | | | |
|---|---|---|---|---|
| 2005/0097765 | A1 * | 5/2005 | Sorensen ................. | B25H 7/00 33/666 |
| 2010/0000102 | A1 * | 1/2010 | Contreras ................. | B43L 9/24 33/27.03 |
| 2011/0296700 | A1 * | 12/2011 | Aplin ...................... | B43L 7/005 33/403 |
| 2018/0021939 | A1 | 1/2018 | Illingworth | |
| 2020/0307300 | A1 | 10/2020 | Logan | |
| 2021/0122185 | A1 | 4/2021 | Ainseba | |
| 2022/0047051 | A1 | 2/2022 | Gugubauer | |
| 2023/0219362 | A1 | 7/2023 | Skillicorn | |

* cited by examiner

STRAIGHTEDGE WITH HOLDER FOR WRITING IMPLEMENT

BACKGROUND

Field

The present disclosure relates to drawing and drafting tools, and particularly to a straightedge, such as a ruler or the like, with a sliding holder for a writing implement, such as a pen, pencil or the like.

Description of Related Art

A straightedge is a bar or strip of wood, plastic, metal or the like which has at least one long edge of sufficiently reliable straightness for use in drawing or testing straight lines, plane surfaces, etc. Common examples of straightedges include rulers, meter sticks, T-squares, the straight side of a protractor, set squares, compasses, etc. Although straightedges make the drawing of straight lines far easier than attempting to draw lines by hand, a steady hand is still required to properly make use of a straightedge. For example, the drawing of a straight line with a ruler requires sufficient pressure to push down on the ruler so that it does not slip, along with a steady hand to push the writing implement along the ruler's edge. If the ruler slips, then the line will be crooked. If the writing implement does not follow the edge of the ruler, the line will also become crooked.

There is a need for a stationary tool that allows for the drawing of different shapes both stably and accurately. For example, there are many instances in which a ruler alone is not sufficient to draw a straight line. In some of these cases, the user may take a long time to keep the pen or pencil steady on the edge of the ruler, and in some of those cases the drawing of the line often departs from the edge of the ruler. Common examples of people who often encounter such difficulties include people with dyspraxia, people with shaking hands caused by disabilities or diseases, such as essential tremor disorder, children who are first learning how to draw, and students who find it difficult to draw on a classroom board. Thus, a straightedge with a holder for a writing implement solving the aforementioned problems is desired.

SUMMARY

A straightedge with a holder for a writing implement includes a planar measuring surface, such as a ruler, set square or the like, with a slide track. The slide track extends along an edge of the planar measuring surface. A first end of a writing implement holder is slidably mounted within the slide track, and a second end of the writing implement holder is adapted for releasably holding a writing implement, such as a pen, pencil or the like. The writing implement holder is movable along the slide track such that the writing implement moves along the edge of the planar measuring surface.

A support made from cork, rubber or the like may be located on a rear surface of the planar measuring surface. The planar measuring surface may be made of stainless steel, aluminum or the like. The writing implement holder may have an inclined shape or a triangular shape, as non-limiting examples. As a further non-limiting example, the first end of the writing implement holder may be adjustably tiltable such that the writing implement holder may tilt at different angles. Similarly, the second end of the writing implement holder may be adjustably tiltable such that the writing implement holder may tilt at different angles. As a further non-limiting example, the writing implement holder may be at least partially flexible, also allowing it to tilt at different angles.

These and other features of the present subject matter will become readily apparent upon further review of the following specification.

DETAILED DESCRIPTION

Figure 1:
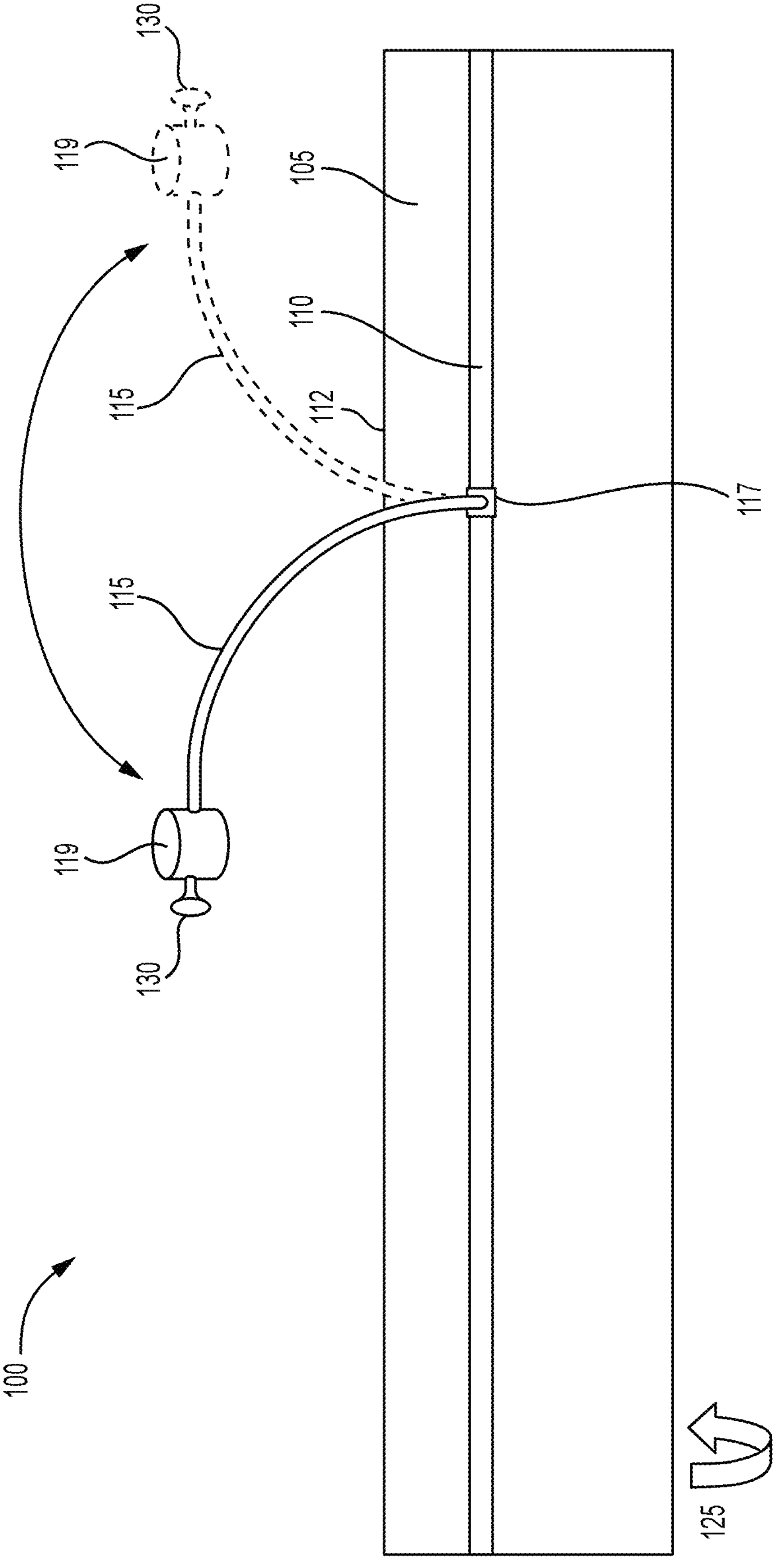
FIG. 1 is a front view of a straightedge with a holder for a writing implement.

FIG. 1 shows a straightedge with a holder for a writing implement 100 having a planar measuring surface 105, a slide track 110 and a writing implement holder 115. It should be understood that the overall shape and relative dimensions of the planar measuring surface 105 are shown for exemplary purposes only. In the non-limiting example of FIG. 1, planar measuring surface 105 is shaped and sized similar to a conventional ruler, however, the straightedge with a holder for a writing implement 100 may be applied to any suitable type of straightedge, such as T-squares, protractors, meter sticks, French curves, set squares (also referred to as "triangles"), compasses or the like. It should be understood that the planar measuring surface 105 may be made of any suitable type of material, such as stainless steel, aluminum, plastic or the like.

The slide track 110 extends along an edge 112 of the planar measuring surface 105. The writing implement holder 115 has a first end 117 that fits into the slide track 110, and is slidable therein, and a second end 119 that secures a writing implement. The writing implement holder 115 is movable along the slide track 110 so that the writing implement holder 115 moves along (i.e., in a direction parallel therewith) the edge 112 of the planar measuring surface 105 and positions the writing implement to draw along the edge 112. In the non-limiting example of FIG. 1 a straight line is drawn, but other shapes can be drawn according to the shape of the edge 112. For example, an arc, a circle, an "s" curve, etc., can be drawn.

The first end 117 of the writing implement holder 115 can include a tilt control feature allowing the writing implement holder 115 to tilt at different angles. As a non-limiting example, the tilt control feature may be a hinge that allows the writing implement holder to move at different angles. The second end 119 of the writing implement holder 115 may also include a tilt control feature allowing the writing implement holder to tilt at different angles. As an alternative, or in conjunction therewith, the writing implement holder 115 may be flexible, allowing it to tilt at different angles. As a further alternative, the writing implement holder 115 may have an inclined shape so that the writing implement secured by the writing implement holder 115 can easily move along the edge 112 of the planar measuring surface 105.

The straightedge with a holder for a writing implement 100 may further include a pencil or pen secured in the second end 119 of the writing implement holder 115. It should be understood that any suitable type of writing implement may be held by second end 119, such as markers, mechanical pencils, pens, pencils, etc. A securing device 130 may be located at the second end 119 of the writing implement holder 115 to hold a writing implement. It should be understood that the securing device 130 may be any suitable type of releasable means of securement, such as a screw, a bracket, a cuff, a clip, a clamp, a band or the like.

Figure 2:
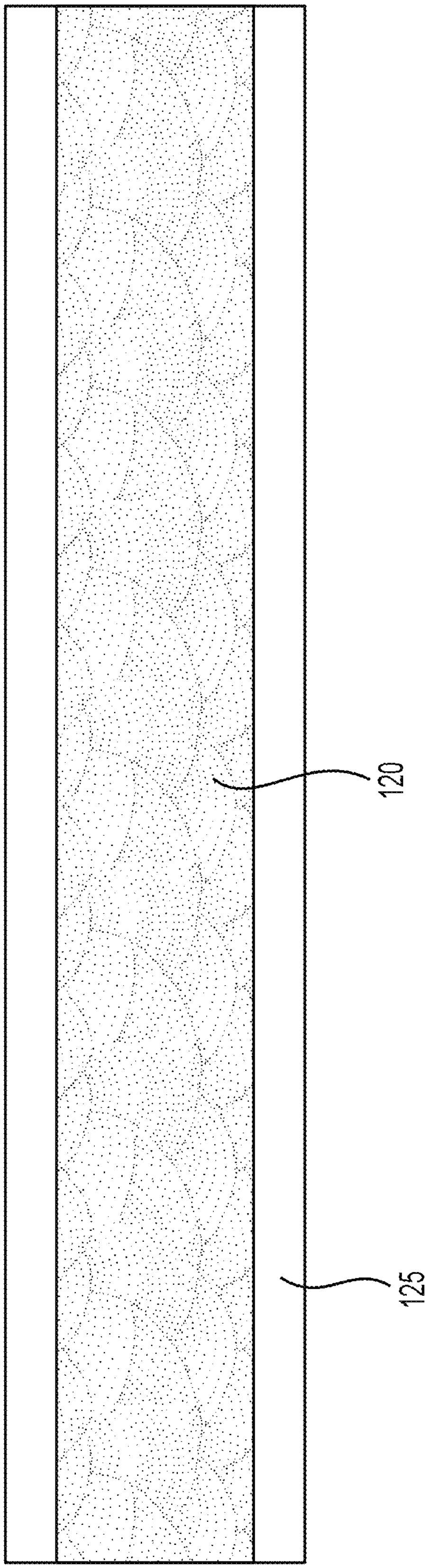
FIG. 2 is a rear view of the straightedge with a holder for a writing implement.

As shown in FIG. 2, the rear face 125 of the planar measuring surface 105 may have a support 120 mounted thereon. The support 120 may provide additional stability and frictional engagement with the surface upon which the user is drawing. It should be understood that support 120 may be made from any suitable type of material, such as cork, rubber or the like.

Figure 3:
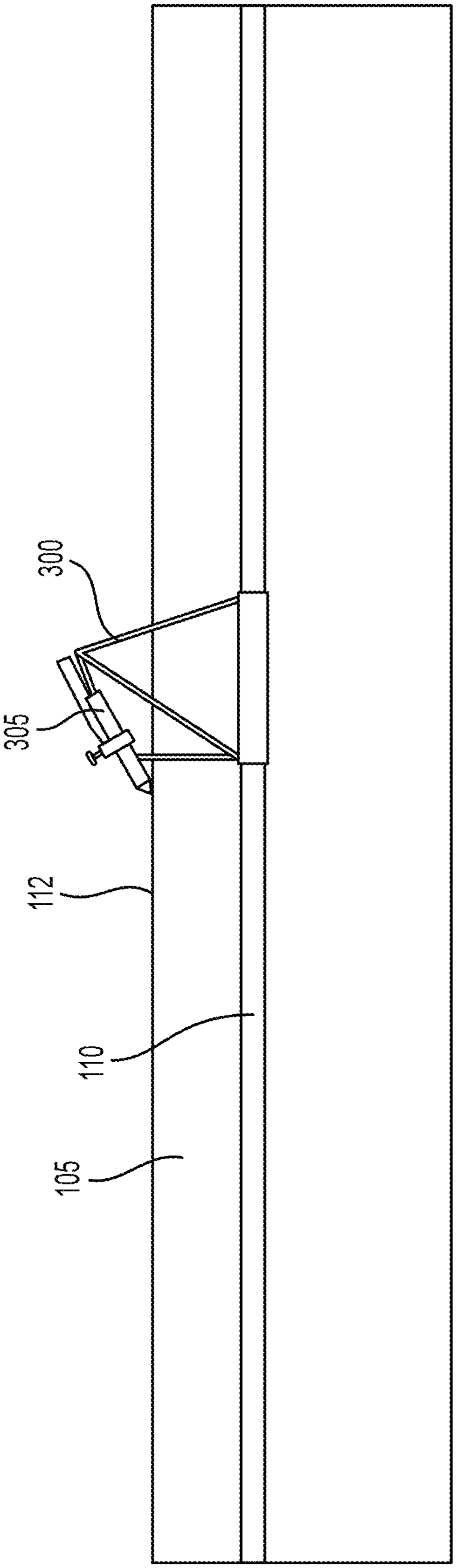
FIG. 3 is a front view of an alternative embodiment of the straightedge with a holder for a writing implement.

In the alternative embodiment of FIG. 3, the writing implement holder 300 is shown with a triangular shape. However, it should be understood that the writing implement holder in either the embodiment of FIG. 1 or FIG. 3 may have any suitable shape and overall configuration. In the non-limiting example of FIG. 3, the triangular writing implement holder 300 is movable along the slide track 110 so that the writing implement holder 300 moves along the edge 112 of the planar measuring surface 105 and positions the writing implement 305 to draw along the edge 112.

It is to be understood that the straightedge with a holder for a writing implement is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

The invention claimed is:

1. A straightedge with a holder for a writing implement comprising:

a planar measuring surface having a slide track, the slide track extending along an edge of the planar measuring surface; and a writing implement holder having a first end that is slidably mounted within the slide track and a second end adapted for releasably holding a writing implement, wherein the writing implement holder is movable along the slide track such that writing implement moves along the edge of the planar measuring surface that the slide track extends along, and wherein each of the first and second ends of the writing implement holder is adjustably tiltable such that the writing implement holder may tilt at different angles.

2. The straightedge with a holder for a writing implement as recited in claim 1, further comprising a support located on a rear surface of the planar measuring surface.

3. The straightedge with a holder for a writing implement as recited in claim 2, wherein the support is made of cork.

4. The straightedge with a holder for a writing implement as recited in claim 2, wherein the support is made of rubber.

5. The straightedge with a holder for a writing implement as recited in claim 1, wherein the planar measuring surface is made of stainless steel.

6. The straightedge with a holder for a writing implement as recited in claim 1, wherein the planar measuring surface is made of aluminum.

7. The straightedge with a holder for a writing implement as recited in claim 1, wherein the writing implement holder has an inclined shape.

8. The straightedge with a holder for a writing implement as recited in claim 1, wherein the writing implement holder has a triangular shape.

9. The straightedge with a holder for a writing implement as recited in claim 1, wherein the writing implement holder is at least partially flexible.

* * * * *